US007733318B2

(12) United States Patent
Awakura et al.

(10) Patent No.: US 7,733,318 B2
(45) Date of Patent: Jun. 8, 2010

(54) DISPLAY DEVICE AND METHOD FOR ADJUSTING A VOLTAGE FOR DRIVING A DISPLAY DEVICE (75) Inventors: Hiroki Awakura, Yokohama (JP); Yasuyuki Kudo, Fujisawa (JP); Norio Mamba, Kawasaki (JP)

(73) Assignee: Hitachi Displays, Ltd., Chiba (JP)

( * ) Notice: Subject to any disclaimer, the term of this patent is extended or adjusted under 35 U.S.C. 154(b) by 1001 days.

(21) Appl. No.: 11/450,892

(22) Filed: Jun. 12, 2006

(65) Prior Publication Data
US 2007/0063957 A1 Mar. 22, 2007

(30) Foreign Application Priority Data
Sep. 20, 2005 (JP) .............................. 2005-271798

(51) Int. Cl.
G09G 3/36 (2006.01)
G09G 5/00 (2006.01)
G06F 3/038 (2006.01)
G09G 5/10 (2006.01)

(52) U.S. Cl. ........................................ 345/96; 345/204
(58) Field of Classification Search ........... 345/87–100, 345/204–206, 690
See application file for complete search history.

(56) References Cited

U.S. PATENT DOCUMENTS

| 6,677,925 | B1 * | 1/2004 | Kawaguchi et al. | ............ 345/98 |
| 2002/0011978 | A1 * | 1/2002 | Yamazaki et al. | ............ 345/87 |
| 2003/0098835 | A1 * | 5/2003 | O'Donnell et al. | ............ 345/100 |
| 2005/0067553 | A1 * | 3/2005 | Agari et al. | ............ 345/102 |

FOREIGN PATENT DOCUMENTS

| JP | 6-138842 | A | | 5/1994 |
| JP | 10-246879 | | * | 9/1998 |
| JP | 10-246879 | A | | 9/1998 |

* cited by examiner

*Primary Examiner*—Alexander S. Beck
(74) *Attorney, Agent, or Firm*—McDermott Will & Emery LLP (57) ABSTRACT A display device includes a display panel having pixels arranged in a matrix form, a driving circuit for outputting an analog voltage according to a video signal to the pixels through signal lines, a plurality of measuring circuits each for detecting the amount of transmitted light, a single totalizing circuit for totalizing the results of measurements made by the measuring circuits, and a control circuit for adjusting a potential on a common electrode of the display panel in accordance with the result of the totalization from the totalizing circuit. The results of measurements made by the plurality of measuring circuits are totalized by the single totalizing circuit.

11 Claims, 5 Drawing Sheets

DISPLAY DEVICE AND METHOD FOR ADJUSTING A VOLTAGE FOR DRIVING A DISPLAY DEVICE

CLAIM OF PRIORITY

The present application claims priority from Japanese patent application serial No. 2005-271798 filed on Sep. 20, 2005, the content of which is hereby incorporated by reference into this application.

BACKGROUND OF THE INVENTION

The present invention relates to a display device for displaying an image on a display panel illuminated by a back light source, and more particularly, to a display device which can adjust a voltage applied to a common electrode.

In a liquid crystal element used for a display device, a continuously applied DC voltage results in a degradation in image quality similar to burn-in. For this reason, in a liquid crystal display, a liquid crystal element is applied with signal voltages which include a positive voltage (Vsig+) and a negative voltage (Vsig−) alternately applied in each frame period. Also, when a voltage (VCOM) is applied to a common electrode of the liquid crystal element, the display luminance is determined in accordance with (Vsig+)−(VCOM) when the positive voltage is applied and with (VCOM)−(Vsig−) when the negative voltage is applied.

In this event, if an inappropriate voltage (VCOM) is applied to the common electrode, the display luminance differs when the positive voltage is applied to the liquid crystal element and when the negative voltage is applied to the liquid crystal element, resulting in flicker at a cycle of two frame periods. For reducing this flicker, it is necessary to accurately adjust the voltage VCOM. In addition, variations in characteristics introduced in liquid crystal panel manufacturing processes can cause an optimal VCOM voltage to differ from one liquid crystal panel to another. For adjusting this VCOM voltage to an appropriate voltage, a pattern for adjustment must be displayed to individually adjust each display device while measuring an actual display luminance visually or using a measuring instrument.

Since an increase in cost would be caused by this VCOM adjusting operation manually performed in the foregoing manner before shipment of liquid crystal display devices, JP-A-6-138842, JP-A-10-246879 describe automatic adjusting methods.

JP-A-6-138842 discloses a measurement of the brightness of an image projected by a liquid crystal projector using a photodiode disposed on a screen. A current flowing through the photodiode fluctuates depending on flicker. A voltage VCOM to a common electrode is adjusted by an electronic volume or the like while measuring the amount of fluctuations in the current. The flicker is reduced by adjusting the voltage VCOM so as to minimize the amount of fluctuations in the photodiode current.

JP-A-10-246879 discloses a liquid crystal panel which comprises a dummy pixel area outside of a display area of the liquid crystal panel, and a photodiode disposed on the dummy pixel area, as opposed to the display device of JP-A-6-138842 which has the photodiode disposed on the screen. This liquid crystal panel features in the photodiode disposed on the dummy pixel area, which does not prevent a display of an input video signal or require a screen. JP-A-10-246879 also describes that the flicker will prominently appear when a halftone checkered pattern is displayed on the dummy pixel area. Also, when an automatic VCOM adjustment function is incorporated in a liquid crystal display, the VCOM voltage can be adjusted to adapt to a variety of environments, for example, variations in temperature and the like.

SUMMARY OF THE INVENTION

In liquid crystal display devices, the flicker can differ in strength depending on the position in a display plane due to the influence of a wiring resistance within the display plane, and the like. Therefore, if a photodiode is provided only at a single point on the display plane for detecting the flicker, this detection strategy can reflect the local flicker at that point but fails to reflect flicker which can occur on the display plane other than the measuring point at which the photodiode is provided.

It is therefore an object of the present invention to provide a display device having a function of automatically adjusting a voltage VCOM applied to a common electrode for effectively suppressing flicker without being misled by local flicker, and a method of adjusting the voltage VCOM.

To achieve the above object, a plurality of photodiodes are disposed for detecting flicker to measure the amount of light over the entire display plane and the flicker. The measurements may be reflected to an adjustment of a voltage VCOM applied to the common electrode, thereby making the flicker less prominent.

When a plurality of photodiodes are provided for detecting the flicker, the part cost increases as a larger number of photodiodes are used. Thus, the photodiodes are made of TFT (thin film transistor) on a TFT array substrate to avoid the part cost. Also, the display device will not increase in thickness when no additional parts are built therein.

As described above, dummy pixels are formed on the TFT array substrate outside the display area, a photodiode is provided in each dummy pixel, and the resulting dummy pixels are arranged in two or more regions outside the display area. For example, the dummy pixels are arranged at two diagonal points on the periphery of the display area, or arranged to surround the periphery of the display area.

Then, the cathodes of all photodiodes are connected to a single storage capacitance Cp. When the storage capacitance Cp is precharged at a predetermined voltage before all the photodiodes are exposed to light, charges accumulated on the storage capacitance Cp leak through each photodiode. When a voltage between both terminals of the storage capacitance Cp is measured after a predetermined time, a total amount of currents which have flown through the respective diodes can be found. This total amount of currents is proportional to an average amount of light received by all the photodiodes, so that an average luminance of the overall panel plane can be found by detecting the total amount of currents. In addition, the strength of flicker can be detected by comparing an average luminance when a positive voltage is applied to a liquid crystal element of the dummy pixel with an average luminance when a negative voltage is applied to the same.

Figure 1:
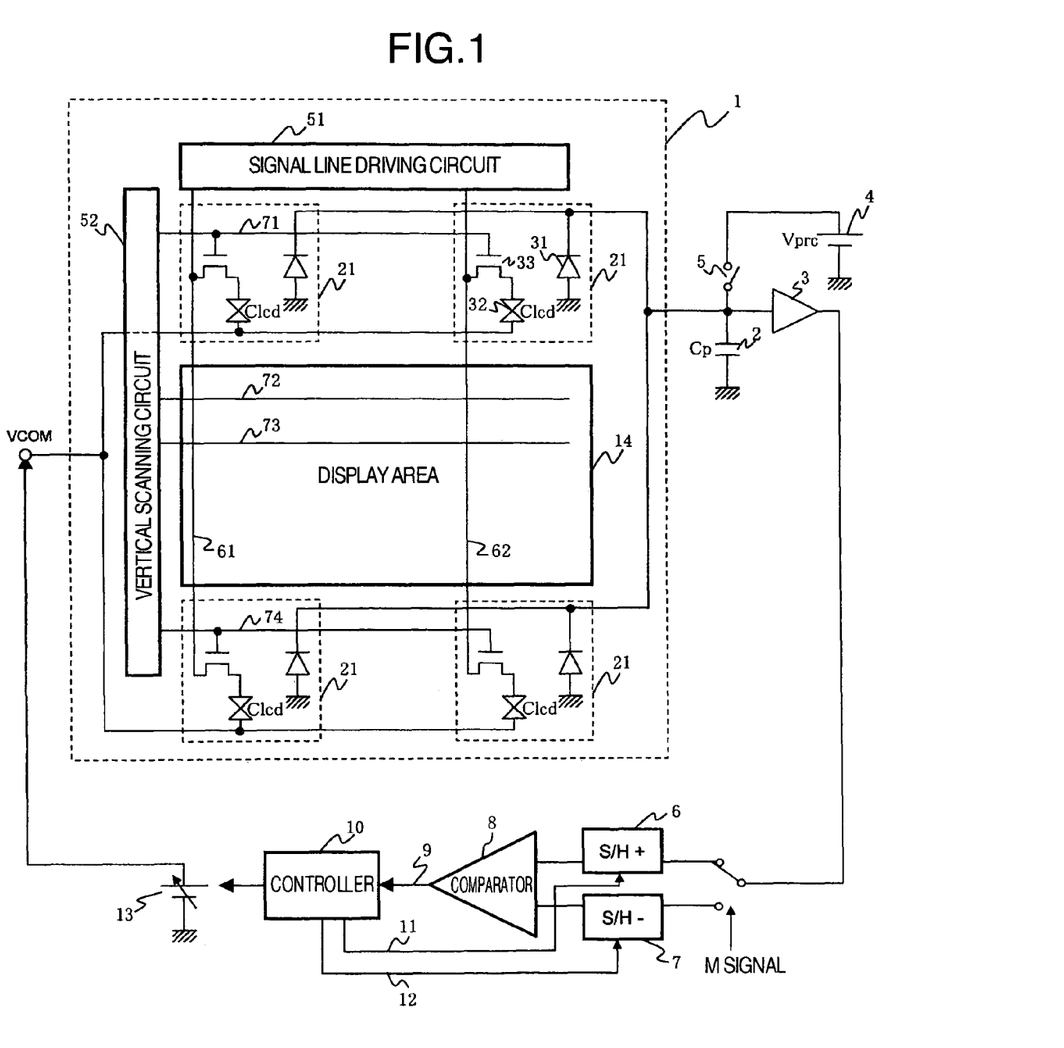
FIG. 1 is a block diagram illustrating the configuration of a display device which has a function of automatically adjusting a voltage applied to a common electrode according to the present invention.

Specifically, the present invention provides a display device which has pixels arranged in a matrix form, as illustrated in FIG. 1. The display device includes a video display pixel unit 14 for displaying a normal video signal on a display panel 1; a signal line driving unit 51 for outputting an analog voltage in accordance with the video signal onto a signal line for driving the video display pixel unit; a plurality of light amount measuring units 31 each for detecting the amount of transmitted light; a single light amount totalizing unit 2 for totalizing results of measurements made by the light amount measuring units; and a common electrode potential control unit 10 for automatically adjusting a potential VCOM on a common electrode of the display device in accordance with the result of the totalization from the light amount totalizing unit. As appreciated from the foregoing, there are a plurality of the light amount measuring units 31, each of which measures the amount of transmitted light, and the results of the measurements are totalized by the single light amount totalizing unit 2.

Figure 6:
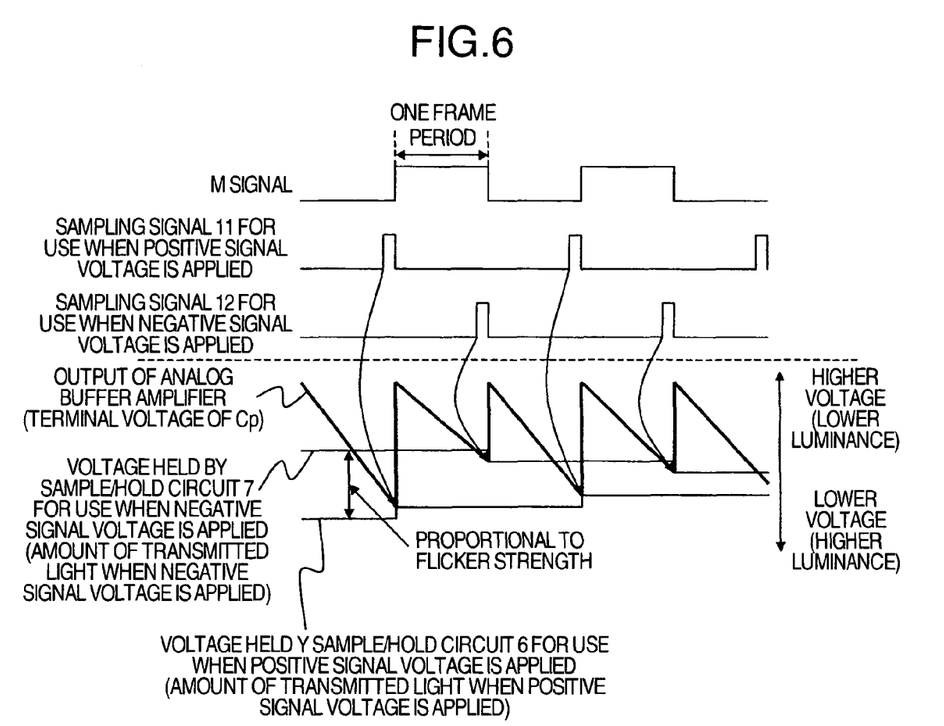
FIG. 6 is a waveform chart for describing the operation of sample/hold circuits 6, 7.
Figure 7:
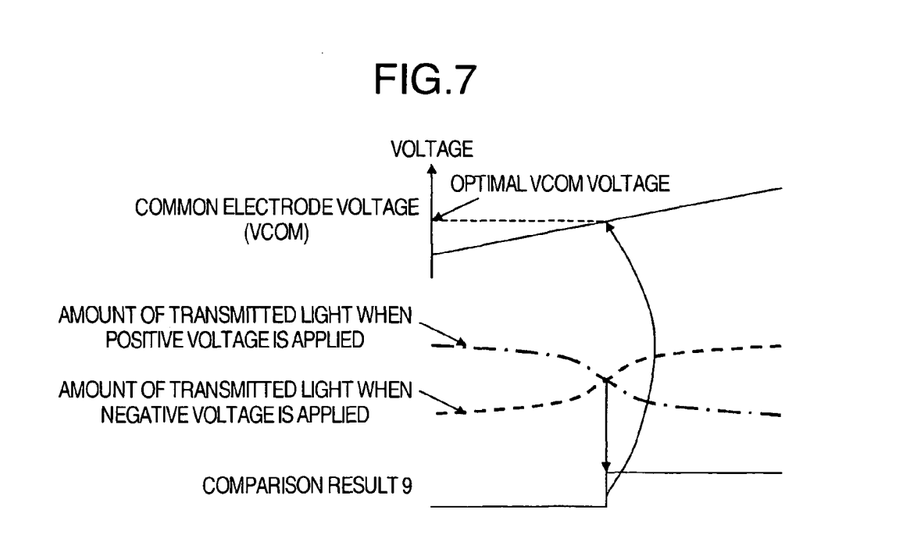
FIG. 7 is a diagram showing the relationship between a change in the amount of transmitted light and a comparison result 9 when a common electrode voltage is varied.

The present invention also provides a method of adjusting a voltage applied to a common electrode on a liquid crystal display device which has liquid crystal elements 32 as pixels in a matrix form, as illustrated in FIGS. 1, 6, 7. The liquid crystal display device includes light amount measuring units 31 each for detecting the amount of liquid crystal transmitted light; a light amount totalizing unit 2 for totalizing the results of the measurements made by the light amount measuring units; a light amount totalization result holding unit 6 for use when a positive signal voltage is applied for sampling and holding the result of light amount totalization when a positive signal voltage is applied to the liquid crystal elements for controlling the amount of light received by the light amount measuring units; a light amount totalization result holding unit 7 for use when a negative signal voltage is applied for sampling and holding the result of light amount totalization when a negative signal voltage is applied to the liquid crystal elements for controlling the amount of light received by the light amount measuring units; a comparator unit 8 for comparing the respective results of light amount totalization provided by the light amount totalization result holding unit for use when a positive signal voltage is applied and the light amount totalization result holding unit for use when a negative signal voltage is applied; and a common electrode applied voltage control unit 10 for controlling a voltage VCOM applied to the common electrode of the liquid crystal display device, wherein the common electrode applied voltage control unit 10 transitions the voltage applied to the common electrode of the liquid crystal display device in steps, and a voltage applied to the common electrode at a timing at which the comparison result 9 outputted by the comparator unit 8 reverses is defined to be an optimal voltage to be applied to the common electrode, such that the optimal voltage is applied to the common electrode of the liquid crystal display device.

In a display device having a function of automatically adjusting a common electrode voltage VCOM, flicker detection points can be increased in an inexpensive and simple circuit configuration. By increasing the flicker detection points, the VCOM voltage can be automatically adjusted with higher accuracy, and natural images can be displayed without prominent flicker.

Other objects, features and advantages of the invention will become apparent from the following description of the embodiments of the invention taken in conjunction with the accompanying drawings.

DESCRIPTION OF THE EMBODIMENTS

First Embodiment

A first embodiment will be described.

FIG. 1 is a schematic diagram illustrating an exemplary configuration of a display device having a function of automatically adjusting a common electrode voltage according to the present invention. The display device comprises a TFT array substrate 1; a precharge capacitance (Cp) 2; an analog buffer amplifier 3; a precharge voltage source (Vprc) 4; a precharge switch 5; a sample/hold circuit 6 for use when a positive signal is applied; a sample/hold circuit 7 for use when a negative signal is applied; a comparator 8 which outputs a comparison result 9; a controller 10; a sampling signal 11 for use when the positive signal is applied; a sampling signal 12 for use when the negative signal is applied; a common electrode power supply 13; a display area 14; dummy pixels 21; photodiodes 31; a liquid crystal element (Clcd) 32; TFT elements 33; a signal line driving circuit 51; a vertical scanning circuit 52; a first signal line 61; a second signal line 62; a first scanning line 71; a second scanning line 72; a third scanning line 73; and a fourth scanning line 74.

The TFT array substrate 1 is one of glass substrates of a liquid crystal panel, generally made up of two glass substrates, on which TFT elements are formed. The present invention may be applied to a direct-view type liquid crystal display device or to a projection type liquid crystal display device.

A plurality of dummy pixels 21 are provided on the TFT array substrate 1. In FIG. 1, the dummy pixels 21 are positioned at four corners of the display area, but the positioning of the dummy pixels 21 is not limited to the illustrated one. Also, the number of dummy pixels may not be four, as shown in FIG. 1.

A photodiode 31 is incorporated in each dummy pixel 21, and has a cathode terminal connected to the precharge capacitance 2 through a signal wire. In other words, the four (a plurality of) photodiodes 31 are connected in parallel to the single precharge capacitance 2. The other end of the precharge capacitance 2 is preferably grounded. The precharge capacitance 2 is, for example, a capacitor.

The liquid crystal element 32 within the dummy pixel 21 has one electrode connected to a common electrode (VCOM), and the other end connected to the TFT element 33. The TFT element 33 in the dummy pixel 21 has a gate terminal connected to a scanning line, so that the liquid crystal element 32 is controlled to be conductive or non-conductive in response to a scanning signal on the scanning line and a halftone signal on a signal line.

The precharge capacitance 2 is charged with a predetermined precharge voltage through a precharge switch 5 before the photodiode 31 within the dummy pixel 21 is exposed to light. During the exposure of the photodiode 31, the precharge switch 5 is opened, so that the electric charge in the precharge capacitance 2 is discharged through the photodiode 31 in accordance with the intensity of the received light.

The analog buffer amplifier 3 buffers a voltage accumulated on the precharge capacitance 2, and outputs the buffered voltage to a subsequent sample/hold circuit 6 or 7.

The precharge voltage source 4 is a power supply for precharging the precharge capacitance 2 with a certain voltage. Its output voltage may be set at a predetermined constant value or may be adjustable in accordance with the amount of back light and the influence of external light.

The sample/hold circuit 6 for use when a positive signal is applied, and the sample/hold circuit 7 for use when a negative signal is applied record and hold the amount of light received by the photodiode when a positive signal voltage is applied to the liquid crystal element 32 of the dummy pixel 21 and when a negative signal voltage is applied to the same as a voltage signal. The output of the analog buffer amplifier 3 is switched in accordance with a polarity signal (M signal) for driving the liquid crystal display device with AC power, such that the output is recorded into the sample/hold circuit 6 or 7.

The comparator 8 compares output voltages of the sample/hold circuit 6 and sample/hold circuit 7, and outputs the comparison result 9.

The controller 10 generally controls a common electrode voltage (VCOM) adjusting function. The controller 10 outputs the sampling signal 11 and sampling signal 12 to control sampling timings for the sample/hold circuit 6 and sample/hold circuit 7, respectively. The controller 10 also captures the comparison result 9 to determine an optimal common electrode voltage (VCOM), and to control the output voltage of the common electrode power supply.

The signal line driving circuit 51 outputs a video signal from the outside of the display device to signal lines (first signal line 61 and second signal line 62) every horizontal period as a halftone signal which is an analog voltage signal. The vertical scanning circuit 52 outputs a scanning signal for selecting a line into which the halftone signal is written.

The first signal line 61 and second signal line 62 transmit the tone signal outputted by the signal line driving circuit 51 to each pixel. While FIG. 1 shows only two signal lines, there are actually much more signal lines.

The first scanning line 71 is connected to a dummy pixel row positioned on the display area 14, and when the first scanning line 71 is applied with a selection pulse, a tone signal for measurement is written into this dummy pixel row. The second scanning line 72 and third scanning line 73 are scanning lines within the display area 14. While there are actually more scanning lines, they are omitted in FIG. 1. The fourth scanning line 74 is connected to a dummy pixel row positioned below the display area 14, and when the fourth scanning line 74 is applied with a selection pulse, a tone signal for measurement is written into this dummy pixel row.

In this embodiment, assume that the vertical scanning line 52 outputs scanning signals to the fourth scanning line 74, first scanning line 71, second scanning line 72, and third scanning line 73 in this order.

Figure 2:
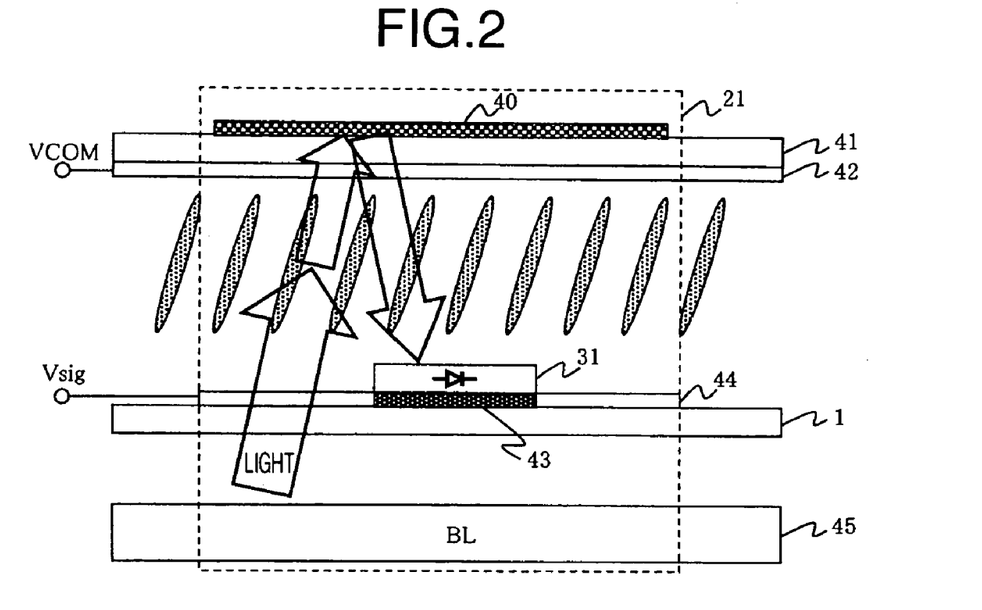
FIG. 2 is a schematic diagram of a dummy pixel 21.

FIG. 2 generally illustrates the dummy pixel 21. As appreciated, the remaining dummy pixels are also similar in configuration. The dummy pixel 21 comprises a reflector 40, an opposing substrate 41, a common electrode 43, a signal electrode 44, and a back light 45. Light emitted from the back light 45 transmits a liquid crystal layer at a transmittance in accordance with a voltage between the common electrode 42 and the signal electrode 44, and travels toward the display plane of the liquid crystal display device.

In this embodiment, the reflector 40 made of a metal or the like is provided on the display side such that the light transmitting the liquid crystal layer of the dummy pixel 21 is reflected by the reflector 40 to return to the TFT array substrate 1, and the reflected light is received by the photodiode 31 formed on the TFT array substrate 1 to measure the intensity of the light which has transmitted the liquid crystal layer. A light shielding plate 43 made of aluminum or the like is provided to prevent the photodiode 31 from being directly irradiated with the light from the back light 45.

Figure 3:
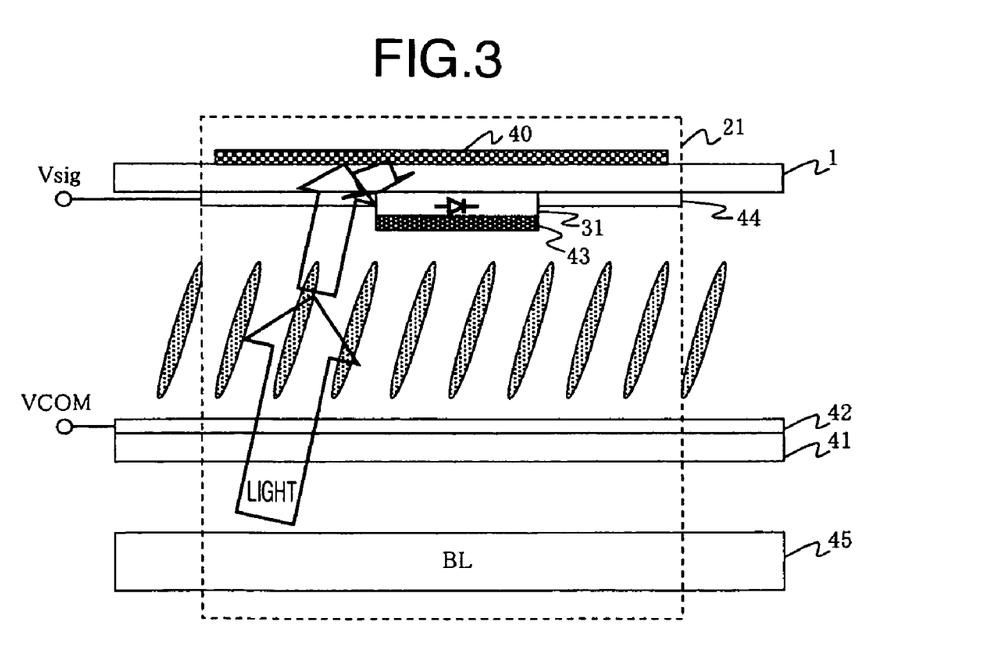
FIG. 3 is a schematic diagram of the dummy pixel 21 in a reverse mount.

FIG. 3 generally illustrates the dummy pixel 21 in a reverse mounting. The "reverse mounting" herein used means that the TFT array substrate 1 and opposing substrate 31 are reverse in position when the liquid crystal panel is assembled. In the reverse mounting, the TFT array substrate 1 is positioned on the display side. From a comparison of FIG. 2 with FIG. 3, it can be seen that in the liquid crystal panel structure in the reverse mounting illustrated in FIG. 3, the light emitted from the back light 45 passes through the liquid crystal layer a less number of times before it reaches the photodiode 31, so that the photodiode 31 can receive the light having a higher intensity.

Figure 4:
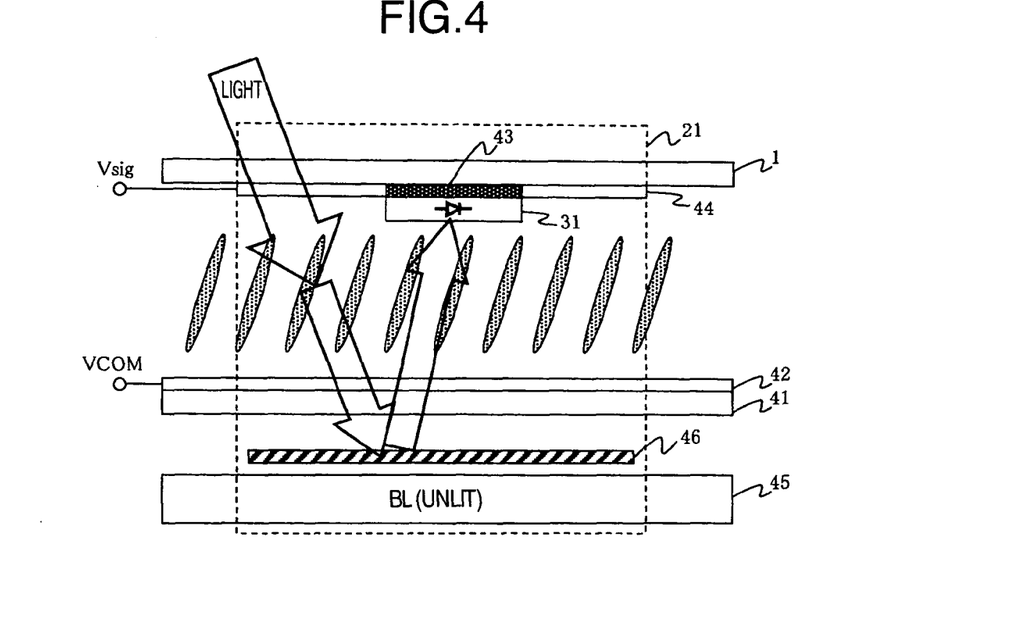
FIG. 4 is a schematic diagram illustrating a semi-transmission liquid crystal display in which the dummy pixel 21 is created.

FIG. 4 illustrates an exemplary configuration of the dummy pixel 21 when it is formed in a semi-transmission liquid crystal panel. FIG. 4 is an example of the dummy pixel configured in the reverse mounting, similar to FIG. 3. Arrows represent a light path in a reflection mode. In the reflection mode, a two-way mirror 46 may be considered to be the same as a reflector. When the light directly impinging on the photodiode 31 from the display plane is shielded by a light shielding plate, the light transmitting the liquid crystal layer can be measured in the configuration of FIG. 4 even if the liquid crystal display device is in the reflection mode.

In addition, the dummy pixel configured as illustrated in FIG. 3 may be mixed with the dummy pixel configured as illustrated in FIG. 4, such that the light transmitting the liquid crystal layer can be detected in either the transmission mode or reflection mode in the semi-transmission liquid crystal display device, in which case the dummy pixel of the type illustrated in FIG. 3 and the dummy pixel of the type illustrated in FIG. 4 may be used as appropriate in response to whether the back light 45 is turned on or off.

Figure 5:
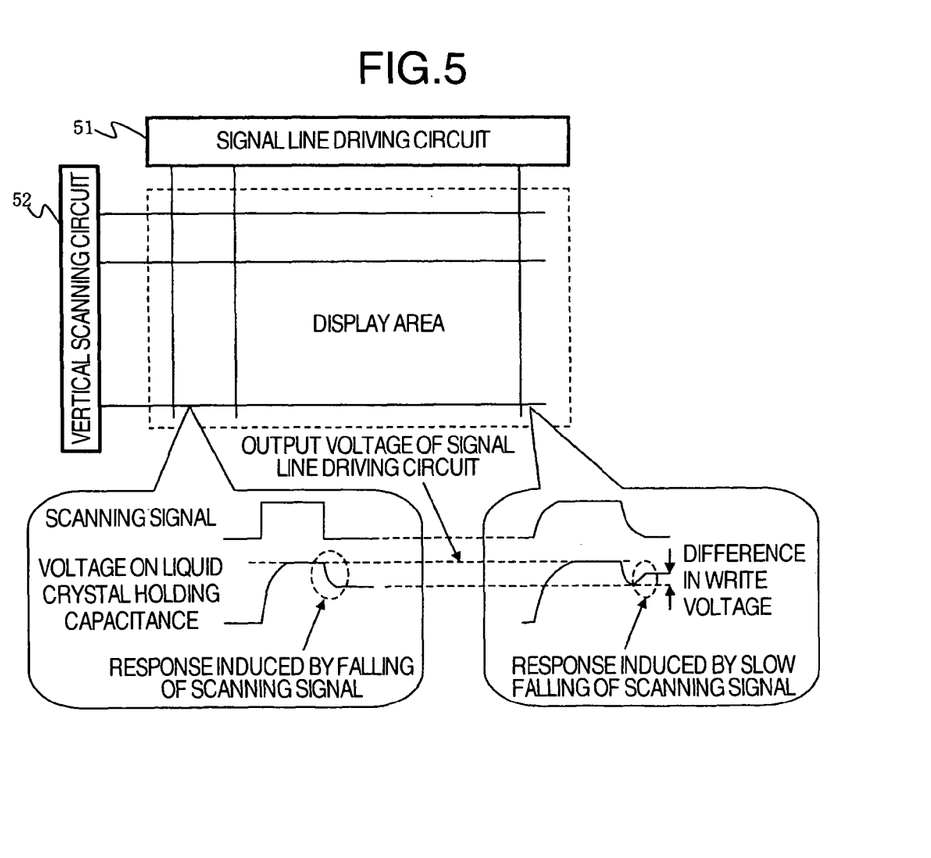
FIG. 5 is a diagram showing an exemplary cause for a difference in horizontal write voltage in a liquid crystal display device.

FIG. 5 shows an example of a cause for a difference in a vertical write voltage in the liquid crystal display. Due to the influence of the wiring resistance of the scanning lines, parasitic capacitance and the like, the waveform of the scanning signal becomes more blunted on a scanning line further away from the vertical scanning circuit 52. As shown in the left-hand balloon in FIG. 5, when the scanning signal is abrupt in its falling, a liquid crystal holding capacitance is affected by the scanning signal through a parasitic capacitance of the TFT element within the pixel, resulting in a slight reduction in a voltage charged on the liquid crystal holding capacitance. On the other hand, as shown in the right-hand balloon in FIG. 5, when the scanning signal is blunted in its falling, the liquid crystal holding capacitance is less affected by the falling scanning signal.

In this way, a difference is generated in the voltage written into the liquid crystal holding capacitance in the horizontal direction of the display area. This voltage difference also affects the display luminance, and causes a difference in the strength of flicker for a shift in the adjustment of VCOM at the left and right ends of the display area. For this reason, the measurement of the strength of flicker is insufficient if it is done at one point, so that the strength of flicker must be measured at a plurality of points in order to correctly adjust the VCOM voltage.

FIG. 6 is a waveform chart for describing the operation of the sample/hold circuits 6, 7. In a frame where the M signal, which is a polarity signal for AC driving, is Low, a positive signal voltage is applied to the common electrode of the dummy pixel 21, whereas in a frame where the M signal is High, a negative signal voltage is applied to the common electrode of the liquid crystal element of the dummy pixel.

The controller 10 shown in FIG. 1 brings the sampling signal 11 to High, and captures the output voltage (terminal voltage of the storage capacitance Cp) of the analog buffer amplifier 3 into the sample/hold circuit 6 immediately before the M signal changes from Low to High, i.e., when a positive signal voltage has been applied to the dummy pixel to expose the photodiode to light for one frame period.

Likewise, in a frame in which the dummy pixel is applied with a negative signal voltage, the controller 10 brings the sampling signal 12 to High, and captures the output voltage (terminal voltage of the storage capacitance Cp) of the analog buffer amplifier 3 into the sample/hold circuit 7.

In this way, the sample/hold circuit 6 samples and holds a display luminance when the dummy pixel is applied with the positive signal voltage, and the sample/hold circuit 7 samples and holds a display luminance when the dummy pixel is applied with the negative signal voltage.

FIG. 7 shows a change in the amount of liquid crystal transmitted light, and a change in the comparison result 9 in FIG. 1 when the common electrode voltage (VCOM) is varied from a low voltage to a high voltage. The amount of liquid crystal transmitted light changes as shown in FIG. 7 when the liquid crystal element is applied with a positive signal voltage and when the liquid crystal element is applied with a negative signal voltage, respectively. As the voltage VCOM is gradually increased from a low voltage, the amount of transmitted light gradually decreases when the positive signal voltage is applied, while the amount of transmitted light gradually increases when the negative signal voltage is applied. In the course of increasing the voltage VCOM, the amount of liquid crystal transmitted light when the negative voltage signal is applied becomes substantially equal to the amount of liquid crystal transmitted light when the positive signal voltage is applied, and a further increase in the voltage VCOM causes a reversal of the magnitude relationship. In this event, the comparison result 9 also reverses. The VCOM voltage becomes optimal when the comparison result 9 reverses.

The controller 10 shown in FIG. 1 searches for the optimal VCOM voltage using the foregoing method, and sets the output voltage of the common electrode power supply 13 to this optimal VCOM voltage. The search of the optimal VCOM voltage and the setting of the optimal VCOM voltage may be performed after the liquid crystal display device has been assembled in a factory and before it is shipped, or may be performed each time the display device is started after it has been delivered to a consumer. Further, with a semi-transmission liquid crystal display device, the optimal VCOM voltage may be searched and set when the transmission mode is switched to the reflection mode.

In FIG. 1, components including the precharge capacitance 2 to the common electrode power supply 13 are disposed outside the TFT array substrate, but these components may be made up of TFT and the like and mounted on the TFT array substrate 1. With the evolution of low-temperature polysilicon in recent years, a TFT-based implementation is sufficiently possible. Also, the output of the analog buffer amplifier 3 may be A/D converted, such that subsequent processing such as sampling/holding, comparison and the like may be performed by digital circuits.

In this embodiment, dummy pixels can be arranged near the output of the signal line driving circuit 51 and on the opposite side across the display area 14, thereby averaging the difference in the strength of flicker associated with the distance from the signal line driving circuit.

As described above, the common electrode voltage (VCOM) of the liquid crystal display device can be automatically adjusted by a simple circuit, so that a natural common electrode voltage can be set such that the flicker is further reduced across the screen.

Second Embodiment

A second embodiment will be next described.

Figure 8:
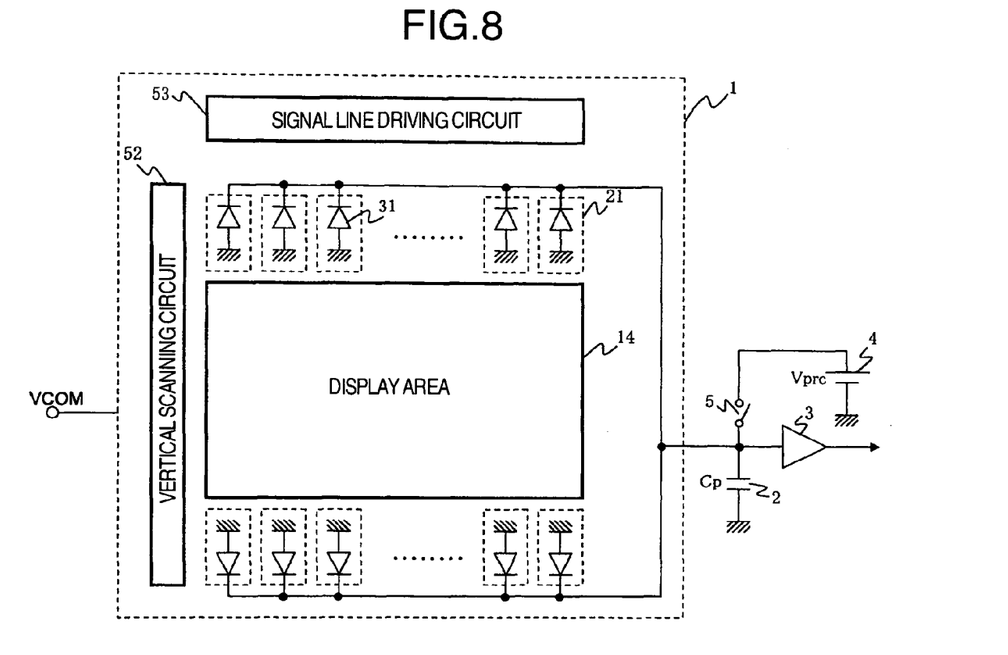
FIG. 8 is a diagram illustrating a layout of dummy pixels 21.

FIG. 8 illustrates an exemplary layout of dummy pixels 21. While the dummy pixels 12 are positioned at four corners of the display area 14 in the first embodiment, two or more dummy pixels may be disposed along one horizontal line or along a plurality of horizontal lines, as illustrated in FIG. 8. By thus increasing the number of dummy pixels 21, variations in the characteristics of each output of the signal line driving circuit 51, and variations in the strength of flicker due to the blunted scanning signal waveform shown in FIG. 5 can be more correctly reflected to the adjustment of VCOM.

While additional dummy pixels 21 are arranged in the horizontal direction in FIG. 8, they may be arranged in the vertical direction. Also, a switch may be provided between the photodiode 31 and the precharge capacitance 2 within the dummy pixel 1, such that when a partial display is performed, the flicker strength can be measured by selecting only those photodiodes positioned near a display area which is being used for the partial display.

Third Embodiment

A third embodiment will be next described.

Figure 9:
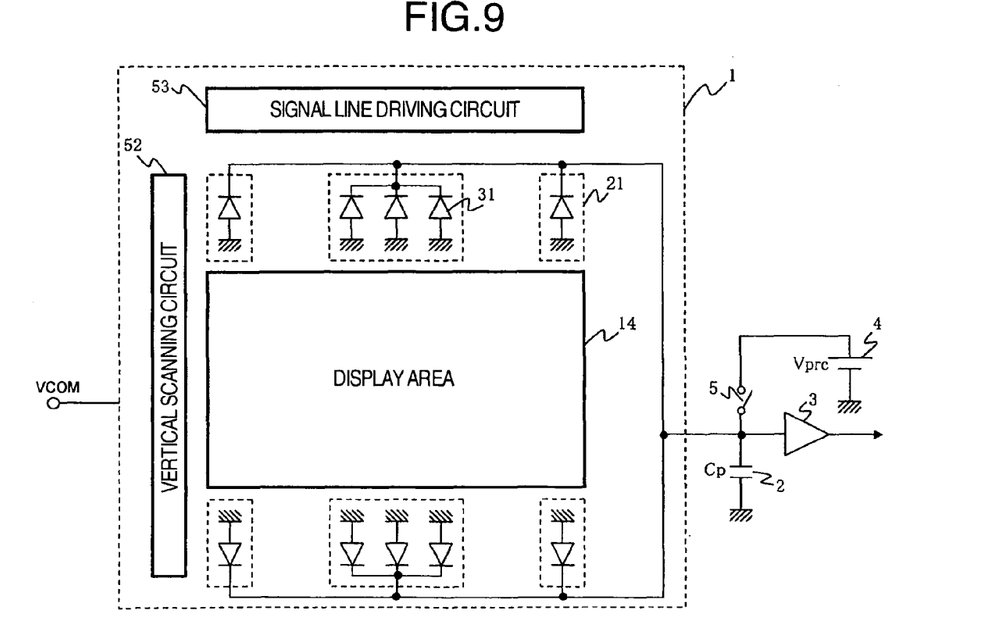
FIG. 9 is a diagram illustrating a layout of photodiodes 31 in accordance with the importance of luminance measuring points.

FIG. 9 illustrates an exemplary layout of photodiodes 31 in accordance with the importance of luminance measurement points. When the flicker is to be suppressed preferentially in a central region of the display area 14 rather than left and right marginal regions of the display area 14, a plurality of photodiodes 31 are created in those dummy pixels 21 positioned in the central region to perform a photoelectric conversion in such a manner that more currents flow into the dummy pixels positioned in the central region, thus weighting the dummy pixels 21 according to the measuring points. In other words, a photoelectric conversion rate in the central region of the display area 14 is made different from that in the left and right marginal regions, thus permitting the dummy pixels in the central region, which supply more currents, to more contribute to the discharge of the precharge capacitance 2 and therefore largely affect the discharge voltage of the precharge capacitance 2.

For weighting each measuring point, the photodiodes 31 in the dummy pixels 21 may be changed in size, or the dummy pixels may be disposed at different densities, in addition to the method of increasing the number of photodiodes 31 within the respective dummy pixels 21, as shown in FIG. 9. In other words, each measuring point can be weighted by providing the photodiodes 31 having different photoelectric conversion rates in the respective dummy pixels 21.

In the present invention, the photodiodes are used for detecting light, but elements such as photo-transistors, photo-IC's and the like may be used other than the photodiodes, and therefore, the present invention is not limited in the configuration of the sensor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display device comprising:
   a display panel having pixels arranged in a matrix form;
   a driving circuit for outputting an analog voltage according to a video signal to said pixels through signal lines;
   a plurality of measuring circuits each for detecting the amount of transmitted light;
   a single totalizing circuit for totalizing the results of measurements made by said respective measuring circuits; and
   a control circuit for adjusting a potential on a common electrode of said display panel in accordance with the result of the totalization from said totalizing circuit, wherein the control circuit comprises:
   a) at least one sample and hold unit for: sampling and holding the result of totalization when a positive signal voltage is applied to a pixel for which the amount of light should be controlled, and sampling/holding the result of totalization when a negative signal voltage is applied to a pixel for which the amount of light should be controlled;
   b) a comparator for comparing the result of totalization when the positive signal voltage is applied with the result of totalization when the negative signal voltage is applied; and
   c) a controller for: controlling a voltage to be applied to the common electrode in accordance with the comparison result, transitioning the voltage to be applied to the common electrode in steps when the voltage to be applied to the common electrode is controlled, and adjusting the voltage applied to the common electrode to a predetermined value at a timing at which a result of the comparison by the comparator reverses in sign.

2. A display device according to claim 1, wherein said totalizing circuit comprises a capacitance.

3. A display device according to claim 1, wherein said measuring circuit is built in a substrate of said display panel.

4. A display device according to claim 1, wherein the amount of transmitted light measured by said measuring circuit is controlled by said line driving circuit.

5. A display device according to claim 1, wherein each of said measuring circuits comprises a photoelectric element which exhibits a photoelectric conversion rate that differs depending on a particular measuring point.

6. A display device according to claim 1, wherein said measuring circuits are disposed at a density which differs from one measuring point to another.

7. A display device according to claim 1, wherein:
   when an image is displayed in a portion of said display panel, measuring circuits positioned near the portion of said display panel are selected.

8. A method of adjusting a voltage applied to a common electrode of a display device, said method comprising the steps of:
   measuring the amount of transmitted light;
   totalizing the results of the measurements of the amounts of transmitted light;
   sampling and holding the result of totalizing the amount of transmitted light when a positive signal voltage is applied to a pixel for which the amount of light should be controlled, and sampling/holding the result of totalizing the amount of transmitted light when a negative signal voltage is applied to a pixel for which the amount of light should be controlled;
   comparing the result of totalizing the amount of transmitted light when the positive signal voltage is applied with the result of totalizing the amount of transmitted light when the negative signal voltage is applied;
   controlling a voltage to be applied to the common electrode in accordance with the comparison result; and
   transitioning the voltage to be applied to the common electrode in steps when the voltage to be applied to the common electrode is controlled, and adjusting the voltage applied to the common electrode to a predetermined value at a timing at which the comparison result reverses in sign.

9. A method according to claim 8, wherein said voltage to be applied to the common electrode is adjusted before shipment of said display device from a factory.

10. A method according to claim 8, wherein said voltage to be applied to the common electrode is adjusted when said display device is started.

11. A method according to claim 8, wherein said voltage to be applied to the common electrode is adjusted when said display device is switched between a reflection mode and a transmission mode.

* * * * *